W. F. WOCHER, R. L. LEMON & L. H. MORTSOLF.
SAFETY ELECTRICAL CIRCUIT BREAKER.
APPLICATION FILED APR. 25, 1908.

940,910.

Patented Nov. 23, 1909.

2 SHEETS—SHEET 1.

WITNESSES:
J. H. Gardner.
K. R. Woddell.

William F. Wocher,
Robert L. Lemon,
Louis H. Mortsolf.
INVENTORS.

BY E. T. Silvius,
ATTORNEY.

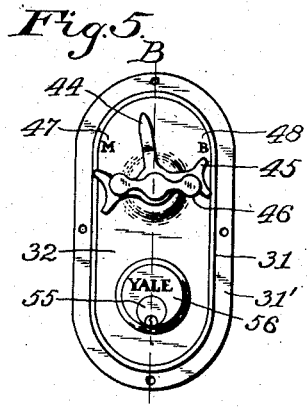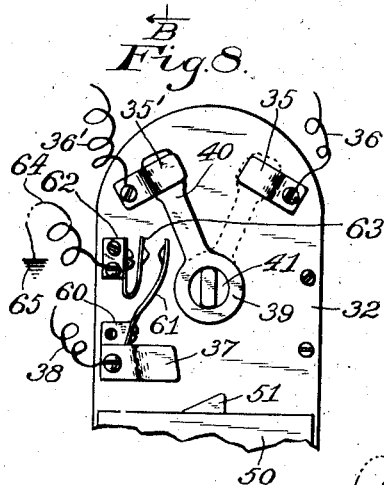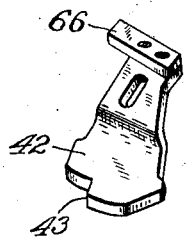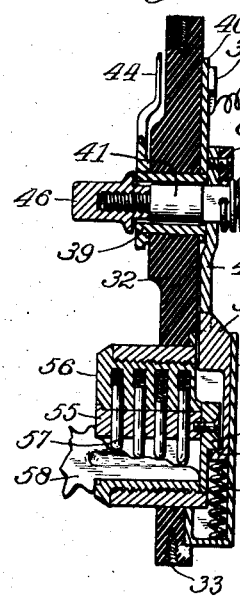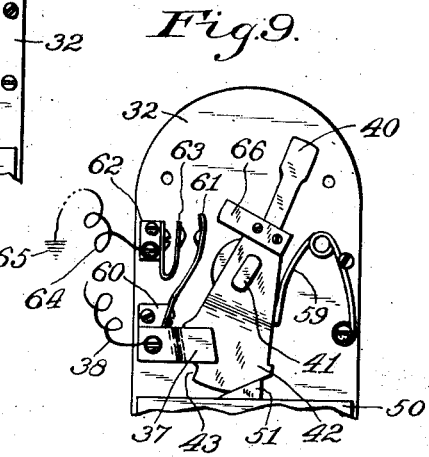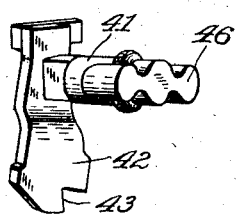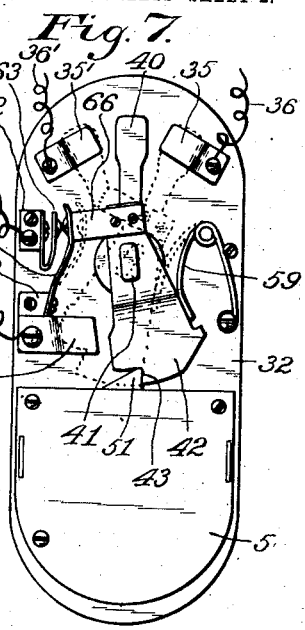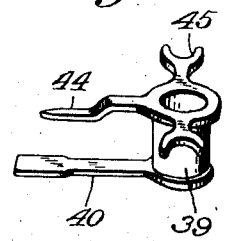

UNITED STATES PATENT OFFICE.

WILLIAM F. WOCHER, ROBERT L. LEMON, AND LOUIS H. MORTSOLF, OF INDIANAPOLIS, INDIANA.

SAFETY ELECTRICAL CIRCUIT-BREAKER.

940,910.  Specification of Letters Patent.  Patented Nov. 23, 1909.

Application filed April 25, 1908. Serial No. 429,141.

*To all whom it may concern:*

Be it known that we, WILLIAM F. WOCHER, ROBERT L. LEMON, and LOUIS H. MORTSOLF, citizens of the United States, residing at Indianapolis, in the county of Marion and State of Indiana, have invented certain new and useful Improvements in Safety Electrical Circuit-Breakers; and we do declare the following to be a full, clear, and exact description of the invention, reference being had to the accompanying drawings, and to figures of reference marked thereon, which form a part of this specification.

This invention relates to devices for either making or breaking electrical circuits and preventing unauthorized persons from connecting the circuits when broken intentionally, the invention having reference particularly to devices whereby electrical circuits may be broken and the circuit-breaker securely locked, and the invention has reference especially to a system of wiring and devices associated with the sparking-circuit of an automobile engine whereby when the circuit is broken intentionally the circuit is automatically grounded so that an attempt to hurriedly connect a wire to make a circuit around the circuit breaker will be defeated.

The object of the invention is to provide a safety electrical-circuit breaker for electrical circuits, and particularly for automobiles in which a sparking-circuit is required for the explosive-engines, so that when the owner of the automobile or similar vehicle leaves it standing in a public place, he may effectually disable it by breaking the sparking-circuit so that no unauthorized person could temporarily complete the circuit without seriously damaging the apparatus.

The invention consists in an improved circuit-breaker and automatic key-locking devices therefor and also a novel electric-circuit in connection therewith, including an inaccessible grounded wire to be connected automatically when the normal circuit is broken; and the invention consists still further in the novel parts and combinations and arrangements of parts, as hereinafter particularly described and defined in the claims appended hereto.

Figure 1:
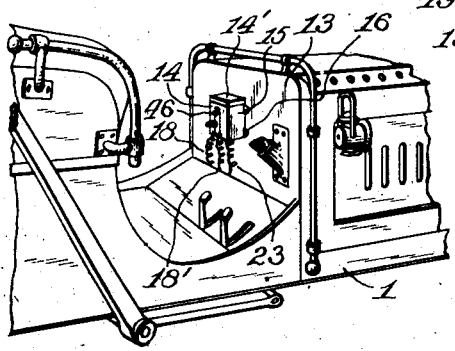
Figure 2:
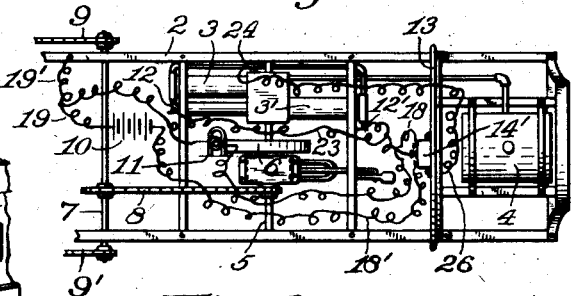
Figure 3:
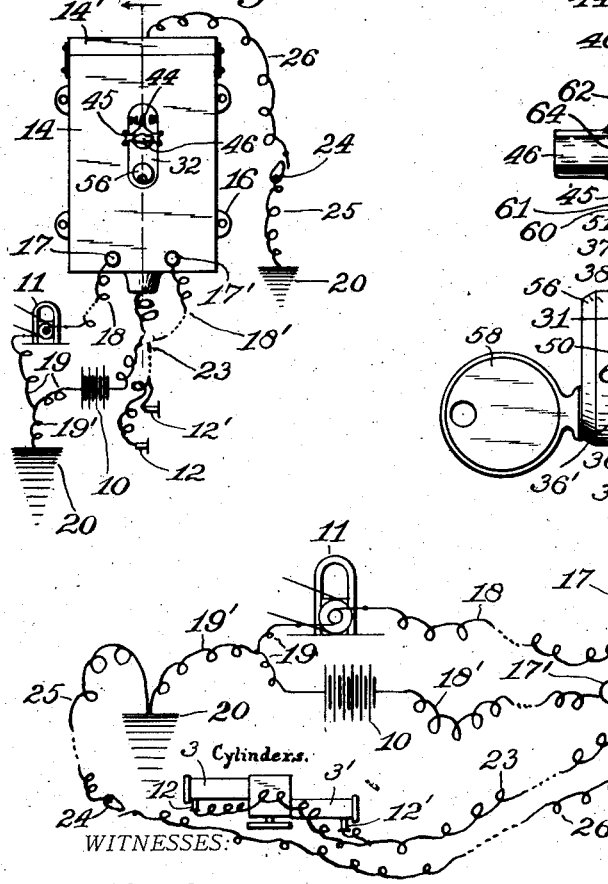
Figure 4:
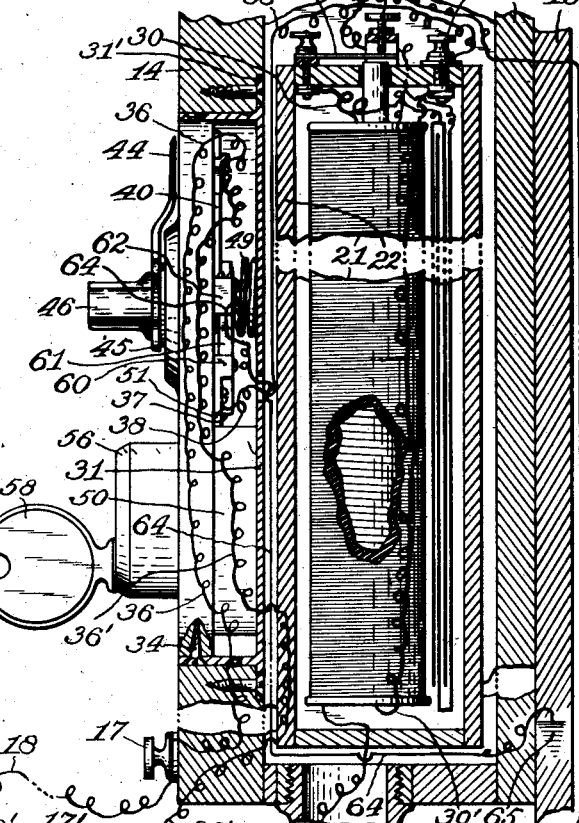

Referring to the drawings, Figure 1 is a fragmentary perspective view of an automobile body of the type of vehicle in which explosive-engines are employed and showing the spark-oil casing thereon with which the present improvements are associated; Fig. 2, a fragmentary plan of the automobile frame and machinery illustrating the manner of connecting the invention therewith, the wiring being diagrammatic; Fig. 3, a front elevation of a spark-coil casing with the circuit wires diagrammatically arranged in connection therewith; Fig. 4, a fragmentary vertical sectional view approximately on the line A in Fig. 3 of the spark-coil and its casing and the improved circuit-breaker together with wiring diagrammatically arranged; Fig. 5, a front elevation of the improved circuit-breaker separate from the spark-coil casing; Fig. 6, a sectional view of the circuit-breaker and its lock separate from the housing thereof on the line B B in Fig. 5; Fig. 7, a rear elevation of the circuit-breaker omitting several parts thereof; Fig. 8, a fragmentary rear elevation in which also several parts are omitted for the sake of clearness; Fig. 9, a fragmentary rear elevation showing the connector in a position different from that shown in Fig. 7; Fig. 10, a perspective view of the switch for connecting or disconnecting the battery and the magneto; Fig. 11, a perspective view of the circuit-connector arm, and Fig. 12, a perspective view of the connector arm attached to its operating spindle and button.

Similar reference characters in the different figures of the drawings designate like elements or features of construction.

In order to describe the function of the invention in one of its most important uses it is represented as being applied to an automobile and in connection with a single spark-coil, and it is obvious that any suitable number of spark-coils may be used as usual.

In the drawings the numeral 1 designates the body of the vehicle; 2, the frame of the vehicle; 3 and 3', the two cylinders of an explosive-engine; 4, the gasolene-tank; 5, the driving-shaft of the engine; 6, the balance-wheel of the engine; 7, a counter-shaft connected by a sprocket-chain 8 to the main-shaft 5 of the engine, and 9 and 9', the driving-chains connected with the counter-shaft 7. The automobile is provided as usual with a sparking-battery 10 and a magneto 11 for supplying the sparking current, the spark-plugs being designated by the numerals 12 and 12'.

The numeral 13 designates the dash-board of the vehicle and in the present case is assumed to be metallic and having connection with the vehicle-frame. The circuit-breaker is mounted on the front 14 of the casing 15 of the spark-coil, the casing having a cap 14' thereon and is provided as usual with ears 16 whereby the casing is attached to the dash-board. The front 14 has two binding-posts 17 and 17' thereon, the former post having a circuit-wire 18 connected thereto and also connected with the magneto 11, and the latter post having a wire 18' connected therewith and also with the battery 10, there being a wire 19 connecting the battery with the magneto and having a branch 19' connected with the frame 2 represented diagrammatically by ground 20 which, as will be understood is intended merely as symbolic of the whole vehicle frame as an electrical conductor. The spark-coil 21 is arranged in a suitable inclosure 22 and mounted as usual in its casing 15, and one end of the secondary winding of the coil is connected by a wire 23 with the spark-plugs 12 and 12' of the engine, the engine being usually provided with a timing make and break device 24 usually having direct electrical connection with the engine mechanism and consequently with the frame or connected by a wire 25, there being a circuit-wire 26 extending from the make and break device to the stationary contact device 27 of the vibrator 28 with which the spark-coil is usually provided, the inclosure of the spark-coil usually having a binding-post 29 connected to the top thereof. One end of the primary-winding of the coil is connected by a wire 30 with the vibrator 28 and the other end of the primary-winding is connected by wire 30' to the binding-post 29. Other wiring in connection with the coil requires no description, being understood by those skilled in the art.

The improved circuit-breaker comprises a housing-box 31 that is secured in a suitable opening in the front 14 of the spark-coil casing, the housing having a flange 31' engaging the inner side of the front and serving as a securing means. The housing comprises a front member 32, which is composed of suitable non-conducting material, and designed to fit in the housing-box to which it is secured by means of threaded holes 33 (as in Fig. 6,) in the edge of the housing-front, and screws 34 inserted in the holes and through the wall of the housing-box before the housing is attached to the front 14. On the inner side of the housing-front 32 two contact-plates 35 and 35' are mounted, one being connected by a wire 36 with the binding-post 17 and the other one connected by a wire 36' with the binding-post 17'; another contact-plate or conducting element 37 is mounted on the inner side of the housing-front 32 and is connected by a wire 38 with the binding-post 29. A hollow shaft 39 is mounted rotatively in the housing-front 32 so as to extend therethrough and has a conducting switch-blade 40 on the inner end thereof to be moved into connection and form part of an electrical circuit with either one of the plates 35 or 35'. A connector shaft 41 is mounted rotatively in the hollow shaft and extends therethrough, and it preferably is a conductor and it has a conducting connector-arm 42 mounted thereon to be moved into contact with the plate 37, or to be disconnected therefrom. The arm 42 has a shoulder 43 at the swinging end thereof.

A pointer 44 is carried on the outer end of the shaft 39, the shaft being movable for shifting the switch-blade 40 by means of handles 45, and the shaft 41 is provided with an operating button or handle 46 that is arranged forward of the handles 45. The position of the switch-blade 40 may be known by reference to numerals as at 47 and 48 on the outer surface of the housing-front 32, as is customary. The switch-blade 40 is constantly in electrical contact with the arm 42 and they are preferably electrically connected also by means of the shaft 41. A coil-spring 49 preferably is employed that is connected to the shaft 41 and is seated against the housing box 31 for holding the arm 42 in contact with the switch-blade 40.

The contact-plate 37 being one conducting element with which the sparking circuit is normally completed by the conducting connector-arm 42, the circuit to be broken by disconnecting the connector arm from the contact-plate, the other one of the necessary two conducting elements with which the connector-arm 42 must be connected to complete the circuit with the circuit wires comprises the switch-blade 40 when employed, or the shaft 41 which obviously may be connected with a circuit wire otherwise than by means of the switch-blade 40, the switch-blade not being required when only one type of battery is employed; or with one battery only, the switch blade 40 may be stationary in constant connection with the battery wire.

A lock-case 50 is mounted on the inner side of the housing-front 32 and has a lock-bolt 51 mounted movably therein and normally pressed by a spring 52 toward or against the connector arm 42 so as to automatically engage the shoulder 43 when the arm is moved away from the contact-plate 37 as appearing in Fig. 7. The latch-bolt has a shoulder 53 engaged by a cam 54 mounted on the barrel 55 of the lock which may be moved rotatively in its housing 56, but is normally prevented from moving by the pins 57, the lock being of well known construction and operated by a peculiar type of key 58, so that there would be little probability of any one but the owner having a key whereby the lock might be operated to release the connector-arm 42 which, when released, is forced by a spring 59 into engagement with the contact-plate 37, or a suitable spring may be otherwise arranged if preferred. The contact-plate 37 has a connector-block 60 attached thereto or integrally formed therewith to which a spring-arm 61 or connecting device is attached to form an electrical connection. A binding-block 62 is mounted on the inner side of the housing-front 32 and has an elastic contact-plate or ground wire contact element 63 attached thereto, opposite to the arm 61, so as to be engaged thereby, and a wire 64 is electrically connected with the plate 63 by means of the block 62, and the wire 64 extends through ordinarily inaccessible channels to a "ground" 65, which may suitably be the dash-board 13 or connected thereto at the rear of the spark-coil casing, so that the wire 64 cannot be tampered with ordinarily, and in most cases may be placed by individual owners in secret passages so that it may not be found by any person contemplating quick theft of the automobile. The tail-end of the arm 42 has a push-bar 66 attached thereto that is composed of suitable non-conducting material or obviously may be insulated from the arm, the arm being normally opposite, but not in contact with the connecting device 61. When the shaft 41 is turned so as to disconnect the arm 42 from the plate 37 to be locked by the lock-bolt 51, the push-bar 66 engages the spring arm 61 and pushes it into connection with the plate 63, thus establishing a circuit between the wire 38 and the wire 64, thus grounding the battery or magneto circuit and foiling any attempt that might be made to connect the circuit for practical use after having been broken by withdrawal of the connector-arm 42 from the contact-plate 37. It should be understood that the circuit connector or breaker and the grounding devices herein described may be variously constructed in detail, and changes within the scope of the appended claims are contemplated.

In practical use the switch-blade 40 may be manipulated in the usual manner and the connector-arm 42 will be normally in contact with the plate 37 as shown in Fig. 9, and when it is desired to disable the automobile the handle 46 will be turned so as to break the circuit as above described, so that the arm 42 will be automatically locked by the lock-bolt 51 without requiring any other manipulations. When it is again desired to establish the normal sparking circuit the key 58 will be used to withdraw the lock-bolt 51, permitting the spring 59 to force the arm 42 again into engagement with the plate 37, the same operations causing the push-bar 66 to be withdrawn sufficiently to permit the connecting device 61 to spring away from the plate 63 and thus break the "ground" connection.

Having thus described the invention what is claimed as new, is—

1. A safety electrical circuit-breaker including an inclosing housing, two separate electrical conducting elements mounted in the housing, a grounded wire extending into the housing and provided therein with a contact-element, a movable conducting connector mounted in the housing and normally in connection with the two conducting elements to form a circuit, the connector being movable away from one of the two elements to break the circuit, means controlled by the conducting connector for automatically connecting one of the two conducting elements electrically with the grounded wire contact element when the conducting connector is moved from one of the two conducting elements to break the circuit, and locking means in the housing automatically acting, when the circuit is broken and ground connection made, to prevent restoration of the circuit and maintain the ground connection.

2. A safety electrical circuit-breaker including an inclosing housing, a hollow shaft mounted rotatively in the housing and extending through the wall thereof, an inner shaft mounted rotatively in the hollow shaft and extending therethrough, a conducting element mounted in the housing, a conducting arm mounted on the inner shaft and spring-pressed normally in connection with the conducting element and movable therefrom by the inner shaft, a locking device mounted movably in the housing for holding the arm when moved away from the conducting element, means for controlling the locking device, two contact-plates mounted in the housing, a switch-blade connected to the hollow shaft and movable thereby to either one of the contact-plates, and means for electrically connecting the arm with the switch-blade.

3. A safety electrical circuit-breaker including a housing, two separate electrical conducting elements mounted in the housing, a movable conducting connector mounted in the housing and normally in connection with the two elements to form a circuit, the connector being movable away from one of the elements to break the circuit, means for moving the connector, a movable locking device mounted in the housing to engage and hold the connector when moved away from one of the elements, means for moving the locking device to the connector, means for retracting the locking device, a conducting ground-wire contact-element mounted in the housing, and means controlled by the movable conducting connector for automatically connecting one of the two conducting elements electrically with the ground-wire contact-element when the locking device is holding the connector away from one of the conducting elements.

4. A safety electrical circuit-breaker including a housing, two electrical conducting elements mounted in the housing and hidden thereby, a conducting connector mounted inaccessibly in the housing and normally in connection with the two elements, the connector being movable away from one of the conducting elements and provided with an operating device extending accessibly through the housing wall, a spring to move the connector to connect the two elements, a lock-bolt mounted in the housing to engage and hold the connector when the connector is disconnected from one of the two elements, a spring normally pressing the lock-bolt to the connector, means for retracting the lock-bolt, a grounded wire provided with a contact-element, and a connecting device for connecting one of the two conducting elements with the contact-element of the grounded wire and controlled by the conducting connector during its movements.

5. A safety electrical circuit-breaker including a housing, two separate electrical conducting elements mounted in the housing, a conducting ground-wire contact-element mounted in the housing, a conducting connector mounted in the housing and normally in connection with the two conducting elements, the connector being movable away from one of the two elements, a connecting device mounted in the housing for connecting one of the two conducting elements electrically with the ground-wire contact-element, means on the conducting connector for controlling the connecting device, a movable locking device mounted in the housing and acting to hold the conducting connector away from one of the two conducting elements when moved therefrom, the locking device acting also to hold the connecting device when connecting one of the two conducting elements with the ground-wire contact-element, and means for moving the locking device.

6. A safety electrical circuit-breaker including a housing, two separate electrical conducting elements mounted in the housing, a conducting ground-wire contact-element mounted in the housing, a conducting connector mounted in the housing and normally in connection with the two conducting elements, the connector being movable away from one of the two elements, a connecting device mounted in the housing and automatically connecting one of the two conducting elements electrically with the ground-wire contact-element when the conducting connector is moved away from one of the two conducting elements, a movable locking device mounted in the housing and automatically acting to hold the conducting connector away from one of the two conducting elements when moved therefrom, the locking device automatically acting also to hold the connecting device when connecting one of the two conducting elements with the ground-wire contact-element, movable lock mechanism barring access to the locking device, and means for operating the lock mechanism and retracting the locking device.

7. A safety electrical circuit-breaker including an inclosing housing, a hollow shaft mounted rotatively in the housing and extending through the wall thereof, an inner shaft mounted rotatively in the hollow shaft and extending therethrough, a conducting element mounted in the housing, a conducting arm mounted on the inner shaft and spring-pressed normally in connection with the conducting element and movable therefrom by the shaft, a conducting ground-wire contact element mounted in the housing, a connecting device mounted in the housing and automatically operating to connect the conducting element electrically with the ground-wire contact-element when the arm is moved from the conducting element, a locking device mounted movably in the housing and spring-pressed into engagement with and holding the arm when moved away from the conducting element, the locking device also acting to hold the connecting device when connecting the conducting element with the ground-wire contact-element, means for retracting the locking device, two contact-plates mounted in the housing, a switch-blade connected to the hollow shaft and movable thereby to either one of the contact-plates, and means for electrically connecting the arm with the switch-blade.

In testimony whereof, we affix our signatures in presence of two witnesses.

WILLIAM F. WOCHER.
ROBERT L. LEMON.
LOUIS H. MORTSOLF.

Witnesses:
 ROBT. COLLIER,
 BERNICE W. GROSS.